United States Patent [19]
Olarig et al.

[11] Patent Number: 6,125,446
[45] Date of Patent: Sep. 26, 2000

[54] COMPUTER ARCHITECTURE WITH AUTOMATIC DISABLING OF HARDWARE/SOFTWARE FEATURES USING SATELLITE POSITIONING DATA

[75] Inventors: Sompong P. Olarig, Cypress; Derace M. Fridel, Tomball; Michael F. Angelo, Houston, all of Tex.

[73] Assignee: Compaq Computer Corporation, Houston, Tex.

[21] Appl. No.: 08/920,383

[22] Filed: Aug. 29, 1997

[51] Int. Cl.[7] ................................................ G06F 12/14
[52] U.S. Cl. .......................... 713/200; 709/223; 380/25
[58] Field of Search .................................. 713/200, 201, 713/202; 709/200, 206, 246, 217, 218, 219, 232, 223; 380/29.32, 25, 4; 701/207, 200; 340/990, 988; 342/352, 357; 707/104

[56] References Cited

U.S. PATENT DOCUMENTS

| | | |
|---|---|---|
| 5,519,403 | 5/1996 | Bickley et al. ........................... 342/352 |
| 5,635,940 | 6/1997 | Hickman et al. . |
| 5,757,916 | 5/1998 | MacDoran et al. . |
| 5,798,732 | 8/1998 | Eshenbach ............................... 342/357 |
| 5,808,564 | 9/1998 | Simms et al. ........................... 340/990 |
| 5,809,234 | 9/1998 | Le Van Suu ............................ 709/200 |
| 5,810,680 | 9/1998 | Lobb et al. .............................. 473/407 |
| 5,835,599 | 11/1998 | Buer .......................................... 380/29 |
| 5,838,277 | 11/1998 | Loomis et al. ........................... 342/357 |
| 5,848,373 | 12/1998 | Delorme et al. ........................ 701/200 |
| 5,884,214 | 3/1999 | Krasner .................................... 701/207 |
| 5,930,804 | 7/1999 | Yu et al. ................................... 707/104 |
| 5,955,973 | 9/1999 | Anderson ................................ 340/988 |
| 5,961,590 | 10/1999 | Mendez et al. .......................... 709/206 |
| 5,968,131 | 10/1999 | Mendez et al. .......................... 709/246 |
| 5,969,668 | 10/1999 | Young, Jr. ................................ 342/357 |

*Primary Examiner*—Joseph E. Palys
*Assistant Examiner*—Rijue Mai
*Attorney, Agent, or Firm*—Conley, Rose & Tayon, P.C.

[57] ABSTRACT

A method and system for enabling/disabling automatic encryption engines/algorithms using the Global Positioning System for country/locale verification and compliance with federal encryption export statutes.

39 Claims, 1 Drawing Sheet

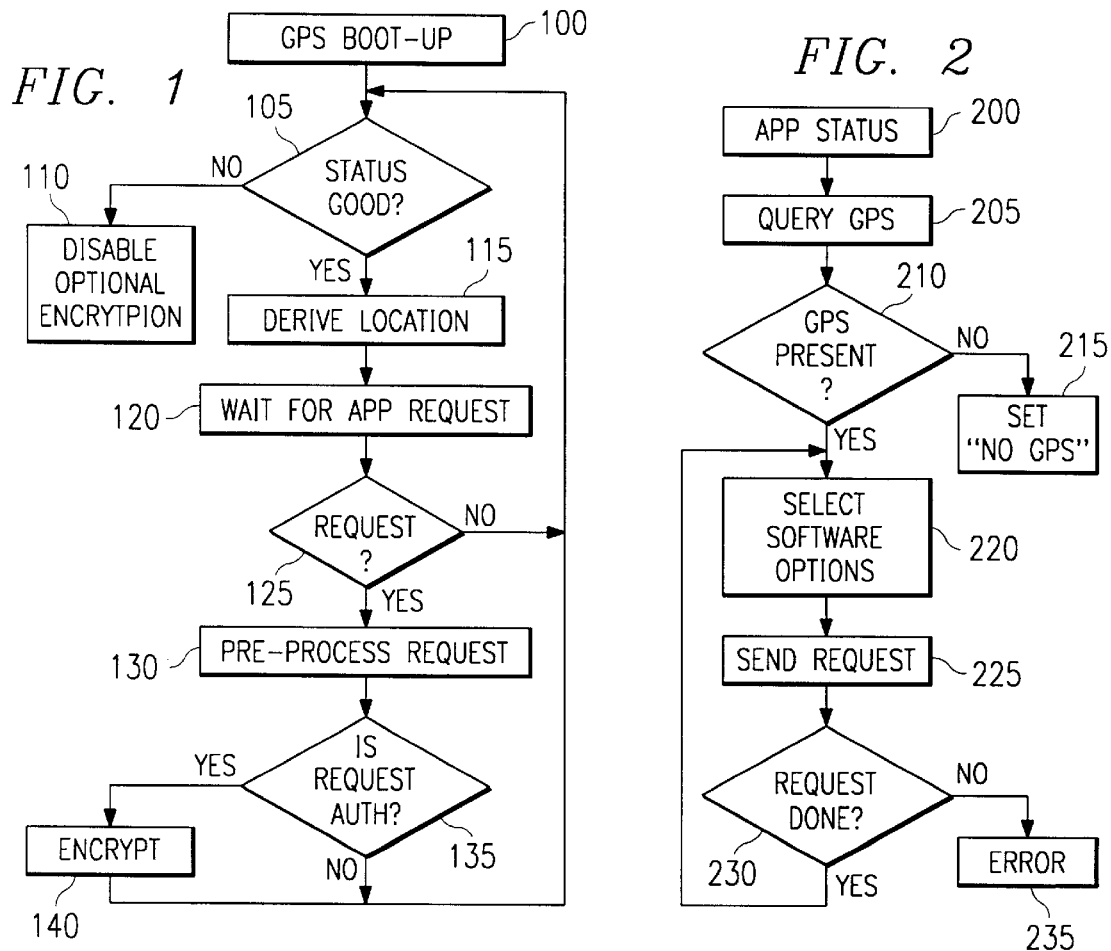
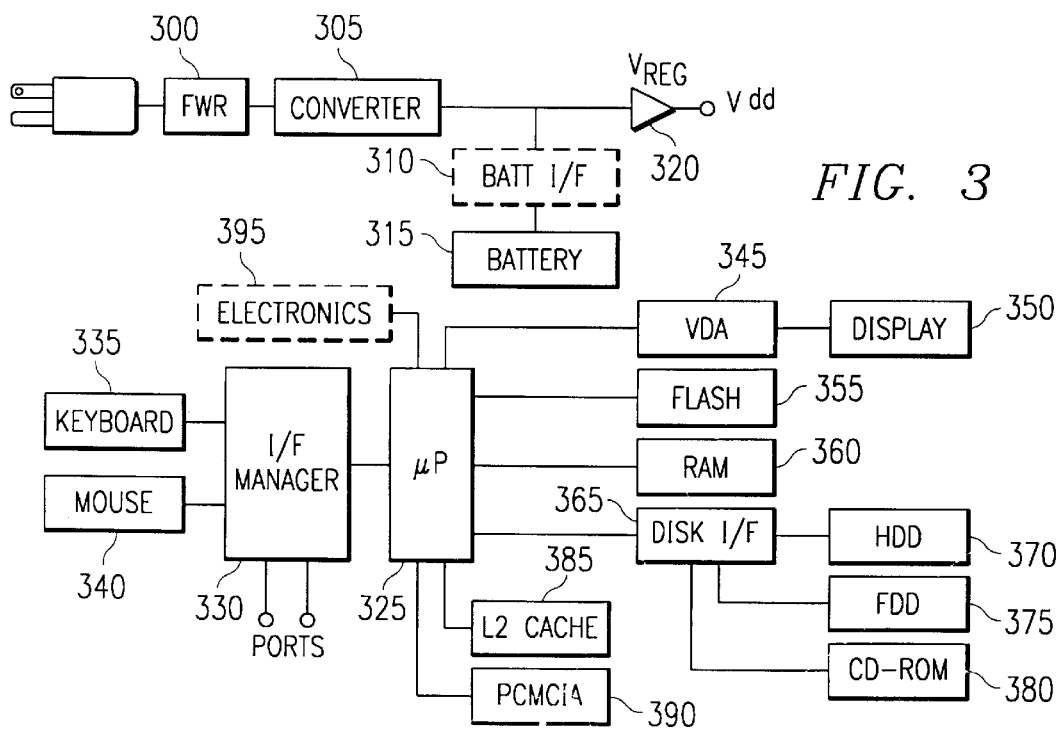

COMPUTER ARCHITECTURE WITH AUTOMATIC DISABLING OF HARDWARE/SOFTWARE FEATURES USING SATELLITE POSITIONING DATA

BACKGROUND AND SUMMARY OF THE INVENTION

The present application relates to a method for selectively authorizing encryption features in a computer using the global positioning system ("GPS") for country/locale verification.

BACKGROUND
Satellite Positioning Systems

The Global Positioning System (GPS) is a collection of satellites owned by the U.S. Government that provides highly accurate positioning and navigation information, 24 hours a day, worldwide. By listening to three or more satellites, a GPS receiver can determine its precise location. While GPS is the most widely used high-accuracy system, there are also other satellite positioning systems in existence.

BACKGROUND
Impact of Export Laws on Sales

As of 1997, U.S. government export restrictions tie the hands of American high-technology businesses by barring export of strong encryption technology. Meanwhile, U.S. companies are losing billions of dollars in sales each year to foreign competitors where the laws regarding the sale of encryption technology are less restrictive. Substantial losses are also caused by the theft of proprietary economic information, which could be better protected if strong encryption technology could be exported and were more widely used.

However, the U.S. is not the only country with restrictive laws. For example, France generally forbids imports of encryption products, unless a license is obtained (which is not easy). Other countries with legal restrictions include, for example, Russia, China, Brazil, and Singapore.

U.S. export laws also restrict the export of powerful computers or similar equipment, if their processing power exceeds a certain level of the Computer Theoretical Performance ("CTP") standard. Currently, systems with a CTP of 2000 or greater are prohibited from export to various countries. However, with the rapidly increasing processing power of modern small computers, this standard will soon be surpassed by high-end workstations, and perhaps even by home computers.

Another problem in complying with export control laws is the inability to effectively control "downstream transfers." The danger is that systems exported to an approved foreign country might then be resold, without the manufacturer's knowledge, into an unapproved country such as Iraq or Iran.

The export restrictions are not only burdensome, but also vary over time. For example, the Commerce Department recently proposed that American companies could export Data Encryption Standard ("DES") 56-bit encryption products, if the companies could demonstrate progress in developing key-recovery products. However, when key-recovery products are introduced, the government requires that the key-recovery process be disclosed to it when warranted. For some corporate customers, providing keys to another entity poses additional risks that the keys may be compromised from that entity. This requirement presents a chilling effect to development of this technology.

Another popular encryption product is Pretty Good Privacy™ ("PGP") which provides up to 2048-bit encryption. This is a "public-key" product which does not necessitate the exchange of a secret key in the transmission of messages. PGP puts together strong algorithms for both authentication and message transmission. The sender encrypts the message with the recipient's freely-disclosed, unique public key. The recipient, in turn, uses her unique private key to decrypt the message. It is also possible to encrypt messages with the sender's private key, allowing anyone who knows the sender's public key to decrypt the message. This process is crucial to creating digital signatures which are becoming more prevalent for business and personal transactions.

BACKGROUND
Modem Position-Dependent Operation

Position-dependent operation of a modem has been suggested by Hickman et al. (U.S. Pat. No. 5,635,940). This patent describes a modem which includes a mechanism for determining its location. Depending upon the location, the communication portion of the equipment is reconfigured to the particular settings required for operation within that locale.

Innovative Computer Architecture With Automatic Disabling of Hardware/Software Features Using GPS Data This innovative system enables selective control of encryption engines/algorithms using embedded GPS hardware for country/locale verification and compliance with relevant legal restrictions, including federal encryption export statutes.

An advantage of this innovative system is that it takes control of the authorization key away from the end user. For example, the software encryption application loaded on the computer obtains GPS information from the embedded GPS hardware and determines if the geographic location of the system is an approved location for a particular level of encryption. Using the GPS, an accurate reading of the user location can be ascertained. If the particular encryption product resident on that machine is restricted for use in the United States, for example, and the locale as verified by the GPS is in the United States, a stronger level of encryption may be authorized. However, if this encryption product is determined to be geographically located in a country unauthorized for the stronger level of encryption, the encryption features can be automatically downgraded or totally disabled to meet federal export restrictions.

Another advantage of the preferred embodiment is that it may be used to control "downstream transfers" of powerful computers that are restricted for export. For example, computers with collective multiprocessor capabilities exceeding a certain maximum performance are restricted from being exported to selected countries. If a computer exceeding this performance restriction is determined to be geographically located in an unapproved country, the processor performance may be selectively reduced to a legal level or even disabled.

Another advantage is that for corporate customers, this innovative method allows certain corporate locations/users to install certain software applications as specified by corporate computer administrators.

An expected advantage of the preferred embodiment is that U.S. export licensing requirements should be met by a single type-authorization. Since the location-dependent security features described above prevent software (or hardware) which is tied to the location data from being operative in any forbidden location, no operative software (or hardware) is being exported, even if inoperative software (or hardware) if physically present in the system. Thus it is expected that once a type-authorization has been granted, separate licensing of each new version of location-dependent software (or new location-dependent peripherals) would no longer be required. Thus software upgrades (or new peripherals) can be shipped quickly, reducing the time to market.

BRIEF DESCRIPTION OF THE DRAWINGS

The disclosed inventions will be described with reference to the accompanying drawings, which show important sample embodiments of the invention and which are incorporated in the specification hereof by reference, wherein:

FIG. 1 shows a GPS hardware control flowchart.

FIG. 2 shows an application flowchart of the process of the presently preferred embodiment.

FIG. 3 shows a block diagram of a computer system with embedded GPS electronics according to the presently preferred embodiment.

DETAILED DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

The GPS system was initially set up for use by the military to provide precise position information. GPS products are used by the military to coordinate and track the movement of soldiers and equipment in the field, to guide military ships at sea, and to provide position and navigation information to military aircraft. Recently, GPS products have been developed for use for many commercial applications. These include: surveying and mapping, aviation and marine navigation, vehicle tracking systems, and mobile computer and cellular platforms.

Even with highly accurate atomic clocks, certain errors do creep into the process of determining a position. Moreover, Selective Availability ("SA") is the program implemented by the U.S. Department of Defense that (when activated) makes GPS intentionally less accurate for non-military users for security reasons. With SA in effect, the accuracy of a position may be no better than within 30 to 100 meters. Even without SA, other errors will be encountered. The most significant of these errors is due to variations in the earth's ionosphere, which effects the speed of GPS radio signals. Another source of error is from water vapor in the troposphere. Both of these errors are fairly small. The accuracy of GPS can be improved with differential GPS ("DGPS") capabilities, by reading a reference signal from a fixed nearby DGPS beacon receiver.

In a nutshell, the interaction between software and hardware (FIGS. 1 and 2) occurs in the following way: the user powers up the system; the system POST procedure executes, checking the status of all hardware; in particular, if the GPS receiver circuit is non-operational, encryption will be disabled; if the GPS receiver circuit is operational, the GPS data is processed and stored, and then waits for the software to execute and generate a request; if no software request is received, the hardware firmware program loops continually checking for a software request; meanwhile, after the software is fully loaded and executes the encryption program, it begins a looping process of sending a software request to the hardware and verifying that the request was sent; the hardware, upon receipt of a software request, processes the request and checks if the request is authorized; as long as the request is authorized, encryption will be allowed. If, for any reason, the hardware firmware reports back to the software that an invalid location was detected, the software determines that it is time to shutdown the particular program that requires the valid location information.

FIG. 1 depicts a GPS hardware control flow diagram from startup to encryption. The process begins with the GPS equipment power up 100, followed by a status check on all systems 105. If any system reports back a failure after power-on, the process halts with optional encryption disabled 110. If all systems report back as operational, the location of the particular transmitter is ascertained by the GPS system 115. After the location is derived, the system waits for an application request signal from the user 120. If it is determined 125 that a request has not been received, the process loops back to the status check 105, and continues until a request is received from any target unit. If a request is received, the request is processed 130 to determine whether the request is a valid request. In state 135, if the request is not authorized, the process loops back to status check 105 to begin the reception processing again. If the request is valid, an authorization code is transmitted back to the target unit to allow encryption of the application, as indicated in state 140. The loop continues in a predetermined timed manner to update the target's status to ensure the target system stays operational.

FIG. 2 shows the software algorithm performed during the authorization procedure. In step 200, the application status is ascertained to ensure proper operation. In step 205, the software queries the hardware System for the GPS hardware. If the hardware is not operational for any reason as determined in step 210, program flow moves to step 215 and the target unit determines that the GPS system will not be used, but limited operation may continue without the encryption (or other enhanced) capabilities. If the GPS hardware is detected and operational, program flow moves to step 220 where the correct software options are selected for the particular target unit. The request is then sent to the hardware (step 225) for transmission to the master unit. The flow then ends with successful handling of the request (step 230), or with an error handling routine (step 235).

FIG. 3 shows a portable computer which can use the innovative cryptographic method. The system includes a power converter 305 which is used to charge a battery 315. Optionally, a battery interface 310 is interposed between the battery and the rest of the circuitry. The power converter 305 is connected, through a full-wave bridge rectifier 300, to draw power from AC mains, and is connected to provide a DC voltage to the battery 315. The battery 315 (or the converter 305), connected through a voltage regulator 320, is able to power the complete portable computer system, which includes in this example:

user input devices (e.g. keyboard 335 and mouse 340);

at least one microprocessor 325 which is operatively connected to receive inputs from said input device, through an interface manager chip 330 (which also provides an interface to the various ports);

a memory (e.g. flash memory 355 and RAM 360), which is accessible by the microprocessor;

a data output device (e.g. display 350 and video display adapter card 345) which is connected to output data generated by microprocessor;

a magnetic disk drive 370 which is read-write accessible, through an interface unit 365, by the microprocessor; and a electronic circuit 395 (e.g. a GPS receiver module) for receiving current location information from a worldwide positioning system.

Optionally, of course, many other components can be included, and this configuration is not definitive by any means. For example, the portable computer may also include a CD-ROM drive 380 and floppy disk drive ("FDD") 370 which may interface to the disk interface controller 365. Additionally, L2 cache 385 may be added to speed data access from the disk drives to the microprocessor, and a PCMCIA 390 slot accommodates peripheral enhancements.

According to another disclosed class of innovative embodiments, there is provided: A computer system, comprising: a microprocessor operatively connected to detect inputs from an input device; a memory which is connected to be read/write accessible by said microprocessor; input/output circuitry operatively connected to said microprocessor; and a wireless locator device which comprises a receiver receptive to at least one worldwide positioning system, and which is operatively connected to communicate current location information to at least one component of said system; wherein said computer system is programmed to selectively disable at least one operational feature thereof, based upon said current location information.

According to another disclosed class of innovative embodiments, there is provided: A computer system, comprising: a microprocessor operatively connected to detect inputs from an input device; a memory which is connected to be read/write accessible by said microprocessor; input/Output Circuitry operatively connected to said microprocessor; and a wireless locator device which comprises a receiver receptive to at least one worldwide positioning system, and which is operatively connected to communicate current location information to at least one component of said system; wherein said computer system is programmed to selectively enable execution of at least one cryptographic algorithm based upon said current location information.

According to another disclosed class of innovative embodiments, there is provided: A computer system, comprising: one or more microprocessors operatively connected to detect inputs from an input device; a memory which is connected to be read/write accessible by said microprocessors; input/output circuitry operatively connected to said microprocessors; and a wireless locator device which comprises a receiver receptive to at least one worldwide positioning system, and which is operatively connected to communicate current location information to at least one component of said system; wherein said microprocessors collectively have a maximum performance of more than a first value based upon a computer performance standard, and are selectively limited to a lower mode of performance less than said first value.

According to another disclosed class of innovative embodiments, there is provided: A method of selectively disabling a feature of a computer, comprising the steps of: (a.) receiving location data from a locator device; and (b.) authorizing or not authorizing operation of said feature, based upon said location data.

According to another disclosed class of innovative embodiments, there is provided: A method of operating a computer, comprising the steps of: (a.) receiving location data from a locator device; and (b.) depending on said location data, conditionally limiting the maximum performance of a computer to less than a first value which is defined by a computer performance standard.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

An optional embodiment provides additional margin-of-error to avoid errors near a border zone. To avoid any slightest possibility of incorrect country determination (and resulting incorrect authorization of cryptographic processing), the lookup stage may include a safety margin.

Non-GPS positioning systems may also be used with this innovative system. Candidates include LORAN, Eagle-Eye, the Russian military satellite positioning system, or other LEOS positioning systems.

Security features can optionally be designed into the system to prevent a user from bypassing the safeguards by emulating the GPS data. For example, it may be necessary to implement a procedure requiring the user to move the system occasionally, so that the GPS data can be seen to change smoothly. This makes hardware emulation more difficult.

It should also be noted that the security features described above are not only applicable to encoding, but also to decoding. Depending on national law, decoding an encrypted message may be legal (or illegal) in a particular country, even if encoding it would not have been legal in that country.

It should also be noted that the security features described above can be used not only to prevent illegal export, but also to prevent illegal import, of any operative version of controlled software.

The problems associated with marketing systems incorporating cryptographic software are particularly difficult, due to the legal requirements which are peculiar to cryptography. However, while the disclosed inventions are particularly advantageous in this area, they can also be applied to other types of software. For example, software publishers may wish to sell certain items of software with nation-limited licensing. (Such practices are common in book publishing, and permit differential pricing to meet the price demands of the different national markets.)

The capabilities provided by the disclosed inventions can also be applied to customizing software operation for different national or regional markets. For example, software parameters (such as operating frequencies for wireless telecommunication) can he automatically tied to the location data retrieved from the locator device.

The capabilities provided by the disclosed inventions can also be applied to selective enablement of hardware peripherals. Thus wireless components which are not authorized by the regulatory requirements of a particular country can be disabled for operation in that country.

It should also be noted that the disclosed innovative ideas are not limited only to systems based on an x86-compatible microprocessor, but can also be implemented in systems using 680x0, RISC, or other processor architectures.

It should also be noted that many other modifications can be made in the hardware implementation of systems which incorporate the inventions. For example, in a multiprocessing system a dedicated control processor, which cannot be programmed by users, can optionally be used to talk to the locator module, and to enable or disable software features.

It should also be noted that the disclosed innovative ideas are not by any means limited to systems using a single-processor CPU, but can also be implemented in computers using multiprocessor architectures.

It should also be noted that the disclosed innovative ideas are not by any means limited to single-user desktop systems, but are also applicable to network servers, mainframe transaction processing systems terminals, engineering workstations, and portable computers.

It should also be noted that the disclosed innovative ideas are affected by import and export laws and are separate issues relative to design and implementation.

It should also be noted that the disclosed innovative ideas are also applicable to a LAN/WAN scenario. The GPS locator device could be connected or embedded into a LAN server such that a network of users could realize the advantages of selective encryption without each user machine requiring a GPS locator device. This implementation introduces a substantial cost savings to corporations with thousands of computer users. In situations where the LAN could extend into border-zone areas, additional software may be required on user machines and the server to address the accuracy limitations of the GPS.

In the sample computer system embodiment the user input devices can optionally include a trackball, a joystick, a joystick, a 3D position sensor, voice recognition inputs, or other inputs. Similarly, the output devices can optionally include speakers, a display (or merely a display driver), a modem, or other outputs. Additionally, an embedded GPS receiver with electronic key circuitry may be incorporated into the design.

What is claimed is:

1. A computer system, comprising:
    a microprocessor operatively connected to detect inputs from an input device; a memory which is connected to be read/write accessible by said microprocessor; input/output circuitry operatively connected to said microprocessor; and
    a wireless locator device which comprises a receiver receptive to at least one worldwide positioning systems, and which is operatively connected to communicate current location information to at least one component of said system;
    wherein said computer system is programmed to selectively disable at least one operational feature thereof, based upon said current location information wherein said computer system is programmed to apply a spatial margin of error to said location data, to avoid any possible errors when the computer is in close proximity to a country's border, before enabling said operational feature.

2. The computer system of claim 1, wherein said operational feature is a software application.

3. The computer system of claim 1, wherein said operational feature includes a cryptographic algorithm.

4. The computer system of claim 1, wherein said operational feature is a hardware computational capability.

5. The computer system of claim 1, wherein said worldwide positioning system is the Global Positioning System.

6. The computer system of claim 1, wherein said wireless locator device is connected so that said computer system becomes inoperative if said locator device is removed.

7. A computer system, comprising:
    a microprocessor operatively connected to detect inputs from an input device; a memory which is connected to be read/write accessible by said microprocessor; input/output circuitry operatively connected to said microprocessor; and
    a wireless locator device which comprises a receiver receptive to at least one worldwide positioning system, and which is operatively connected to communicate current location information to at least one component of said system;
    wherein said computer system is programmed to selectively enable execution of at least one cryptographic algorithm based upon said current location information wherein said microprocessor is programmed to apply a spatial margin of error to said location data, to avoid any possible error when the computer is in close proximity to a country's border, before enabling said execution.

8. The computer system of claim 7, wherein said cryptographic algorithm uses more than 56-bit encryption.

9. The computer system of claim 7, wherein said cryptographic algorithm is an encoding algorithm.

10. The computer system of claim 7, wherein said worldwide positioning system is the Global Positioning System.

11. The computer system of claim 7, wherein said wireless locator device is connected so that said computer system becomes inoperative if said locator device is removed.

12. The computer system of claim 7, wherein said wireless locator device is integrated into a system board of said computer.

13. A computer system, comprising:
    one or more microprocessors operatively connected to detect inputs from an input device; a memory which is connected to be read/write accessible by said microprocessors; input/output circuitry operatively connected to said microprocessors; and
    a wireless locator device which comprises a receiver receptive to at least one worldwide positioning system, and which is operatively connected to communicate current location information to at least one component of said system;
    wherein said microprocessors collectively have a maximum performance of more than a first value based upon a computer performance standard, and are selectively limited to a lower mode of performance less than said first value, based on said current location information wherein said microprocessor is programed to apply a spatial margin of error to said location data, to avoid any possible error when the computer is in close proximity to a country's border.

14. The computer system of claim 13, wherein said computer comprises more than four said microprocessors.

15. The computer system of claim 13, wherein said microprocessors are operatively connected to comprise a parallel processing architecture.

16. The computer system of claim 13, wherein said worldwide positioning system is a Global Positioning System.

17. The computer system of claim 13, wherein said worldwide positioning system is a Differential Global Positioning System.

18. The computer system of claim 13, wherein said wireless locator device is integral with and internal to said computer, and connected so that said computer becomes inoperative if said locator device is removed.

19. The computer system of claim 13, wherein said wireless locator device is integrated with said microprocessor into a system board of said computer.

20. A method of selectively disabling a feature of a computer, comprising the steps of:
    (a.) receiving location data from a locator device; and
    (b.) authorizing or not authorizing operation of said feature, based upon said location data;

wherein said locator device is integral with and internal to the computer, and connected so that the computer becomes inoperative if said locator device is removed wherein said authorizing step applies a spatial margin of error to said location data, to avoid any possible errors when the computer is in close proximity to a country's border.

21. The method of claim 20, wherein said locator device is a Global Positioning System receiver.

22. The method of claim 20, wherein said locator device is compatible with Differential Global Positioning System operation.

23. The method of claim 20, wherein said feature is a software feature.

24. The method of claim 20, wherein said feature is a hardware feature.

25. The method of claim 20, wherein said feature is an application request for execution of a cryptographic algorithm.

26. The method of claim 20, wherein said feature is a software application which is licensed only in some locations.

27. The method of claim 20, wherein said authorizing step is included with a Power-On Self-Test procedure.

28. The method of claim 20, wherein said locator device is a wireless receiver.

29. The method of claim 20, wherein said locator device is integrated into a system board of a computer, and connected so that said computer becomes inoperative if said locator device is removed.

30. A method of operating a computer, comprising the steps of:

(a.) receiving location data from a locator device; and (b.) depending on said location data, conditionally limiting the maximum performance of a computer to less than a first value which is defined by a computer performance standard, wherein said conditional limiting step applies a spatial margin of error to said location data, to avoid any possible errors when the computer is in close proximity to a country's border.

31. The method of claim 30, wherein said conditional limiting step is included with a Power-On Self-Test procedure.

32. The method of claim 30, wherein said locator device is compatible with a Global Positioning System signal format.

33. The method of claim 30, wherein said computer comprises more than four said microprocessors.

34. The method of claim 30, wherein said microprocessors are operatively connected to comprise a parallel processing architecture.

35. The method of claim 30, wherein said computer performance standard is a Computer Theoretical Performance standard.

36. The method of claim 30, wherein said locator device is a wireless receiver.

37. The method of claim 30, wherein said locator device is compatible with a worldwide positioning system, said worldwide positioning system is a Global Positioning System.

38. The method of claim 30, wherein said locator device is a wireless receiver and is integral with and located internal to the computer, and connected so that the computer becomes inoperative if said locator device is removed.

39. The method of claim 30, wherein said locator device is a wireless receiver and is integrated into a system board of the computer.

* * * * *

UNITED STATES PATENT AND TRADEMARK OFFICE
CERTIFICATE OF CORRECTION

PATENT NO. : 6,125,446
DATED : September 26, 2000
INVENTOR(S) : Sompong P. Olarig, Derace M. Fridel and Michael F. Angelo It is certified that error appears in the above-identified patent and that said Letters Patent is hereby corrected as shown below:

Column 7,
Line 38, change "systems" to -- system --;

Column 8,
Line 41, chagne "programed" to -- programmed --; and

Column 9,
Line 4, change "step applies" to -- step (b.) applies --.

Signed and Sealed this

Eleventh Day of December, 2001

*Attest:*

*Attesting Officer*

NICHOLAS P. GODICI
*Acting Director of the United States Patent and Trademark Office*